B. PEARSON
Wagon-Wheel.
No. 51,747. Patented Dec 26, 1865
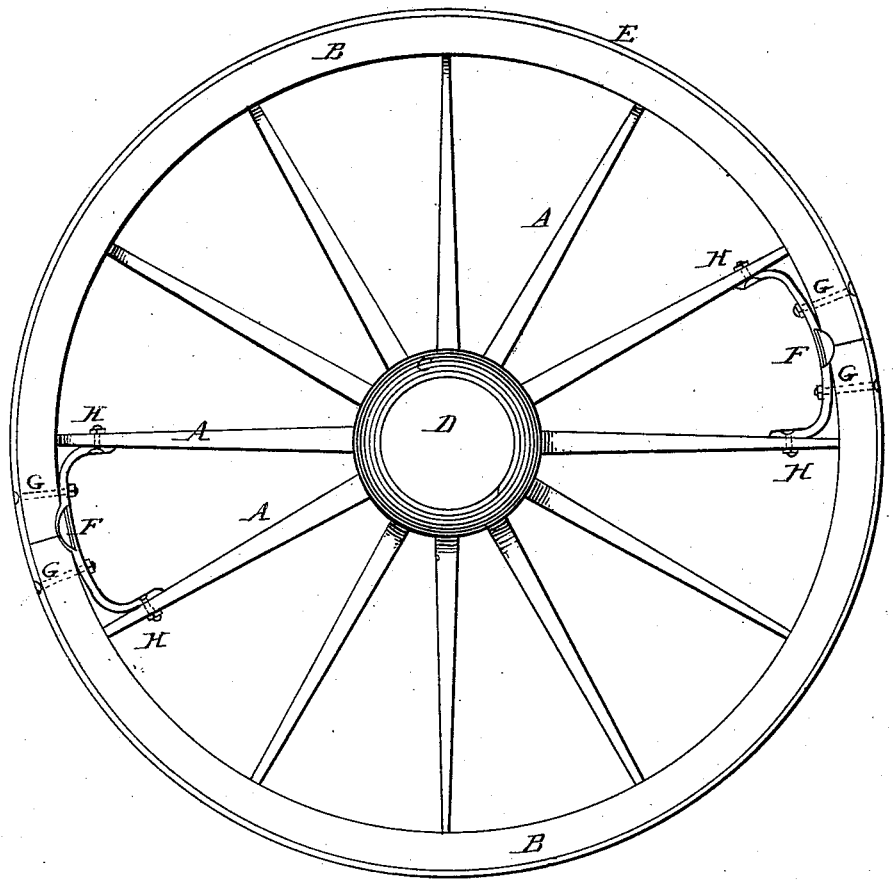

UNITED STATES PATENT OFFICE.

BENJAMIN PEARSON, OF SALEM, MASSACHUSETTS.

IMPROVEMENT IN WAGON-WHEELS.

Specification forming part of Letters Patent No. 51,747, dated December 26, 1865.

*To all whom it may concern:*

Be it known that I, BENJAMIN PEARSON, of Salem, in the county of Essex and State of Massachusetts, have invented a new and useful Improvement in Wagon-Wheels; and I do hereby declare that the following is a full, clear, and exact description thereof, which will enable others skilled in the art to make and use the same, reference being had to the accompanying drawing, forming part of this specification, in which—

Figure 1 is a side view of a wagon-wheel with my improvement attached.

It is well known that the weak places of the wheel are the points where the ends of the fellies come together. When the fellies are worked out the ends of the fellies are cross-grained, and are very apt to chip off, thereby still further weakening the places already weak. As soon as the wheel has been run a very short time the rim of the wheel sinks at these points and flattens, that loosens the tire, and the next effect is that the wheel begins to flatten between the other spokes, becoming octagonal in form, instead of being circular, and the wheel has to be sent to the shop for repairs. To remedy this the fellies were made heavier and the wheel bound with a heavier tire; but this only delays the result which is sure to follow, and makes the wheel very cumbersome and heavy. When the fellies are bent the liability to chip is avoided, but the joints are still weak, and the same results follow as in the other case.

The object of my invention is to remedy this difficulty; and it consists in combining with a wagon-wheel at the point or points where the fellies meet an arched or crown brace or supporter, as hereinafter more fully described.

A are the spokes, B the fellies, C the hub, D the axle, and E the tire, of a wagon-wheel, all of which parts are made and arranged in the ordinary way, except that the fellies and tire may be made lighter than when my improvement is not applied.

F is an arched or crown supporter, which is applied to the wheel at the points where the ends of the fellies meet. The central part of the brace F is made broad and slightly bent over, so as to clasp the ends of the fellies and prevent lateral displacement. This central part of the supporter is held firmly against the ends of the fellies at their point of meeting by bolts and nuts G passing through the supporter F, the fellies B, and the tire E. The ends of the supporters extend up in the form of an arch to the adjacent spokes A, to which they are attached by the bolts and nuts H. The supporters F are applied after the wheel is completed in other respects, and can consequently be applied as readily to wheels that have been used as to new ones.

If it is necessary to reset the tire, the supporters may be made to accommodate themselves to the slightly decreased distance they will have to span by crowning them a little more; or they may be wholly removed from the wheel and their central part upset.

By means of this improvement the wheel may be made much lighter than it could otherwise be made, and yet be able to sustain an equal or even heavier load, thereby relieving the horses from drawing an unnecessary burden.

I claim as new and desire to secure by Letters Patent—

A metallic crown felly-supporter, constructed and applied substantially as described, in combination with the rim and spokes of a wagon-wheel at the point or points where the segments of the fellies meet, substantially as and for the purpose set forth.

BENJ. PEARSON.

Witnesses:
    M. M. LIVINGSTON,
    JAMES T. GRAHAM.